United States Patent [19]

Montagna

[11] 3,999,980
[45] Dec. 28, 1976

[54] FLUXLESS RECOVERY OF METALLIC ALUMINUM FROM WASTES

[75] Inventor: Dominic Montagna, Baltimore, Md.

[73] Assignee: The United States of America as represented by the Secretary of the Interior, Washington, D.C.

[22] Filed: May 9, 1975

[21] Appl. No.: 576,400

[52] U.S. Cl. .................................. 75/68 R; 75/24
[51] Int. Cl.² ...................................... C22B 21/00
[58] Field of Search ............... 75/24, 63, 65, 68 R, 75/44 S

[56] References Cited

UNITED STATES PATENTS

| | | | |
|---|---|---|---|
| 969,253 | 9/1910 | Diack | 75/24 |
| 1,160,430 | 11/1915 | Mellen | 75/68 R |
| 2,754,199 | 7/1956 | Stroup et al. | 75/24 |
| 3,649,247 | 3/1972 | Brondyke | 75/68 R |
| 3,770,424 | 11/1973 | Floyd et al. | 75/24 |
| 3,848,813 | 11/1974 | Stanczyk et al. | 241/24 X |

Primary Examiner—M. J. Andrews
Attorney, Agent, or Firm—William S. Brown; Donald R. Fraser

[57] ABSTRACT

Aluminum metal is recovered from processing wastes, such as dross, beverage can scrap and the like, without use of a flux by heating the wastes to a temperature above the melting point of aluminum but below about 800° C while maintaining the wastes under a protective gaseous atmosphere which is substantially inert to molten aluminum. After melting of aluminum contained in the wastes is complete, the heated material is agitated gently to agglomerate the molten aluminum and to cause its settling and collection in the bottom of the containment vessel. Molten aluminum is thereafter removed from the vessel leaving a substantially inert residue. Argon is preferred as the protective atmosphere.

8 Claims, 2 Drawing Figures

FLUXLESS RECOVERY OF METALLIC ALUMINUM FROM WASTES

BACKGROUND OF THE INVENTION

When aluminum metal is melted, there is formed on the surface of the molten metal a skim or dross comprising a mixture of the reaction products of aluminum with air. These reaction products include aluminum oxide, aluminum nitride and other non-metallic impurities. Prior to tapping or pouring the molten aluminum, the dross is skimmed or raked off the surface of the molten metal. The skimmed dross inevitably contains a substantial amount of entrained metal; often as much as 50–90% by weight. It has been estimated that as much as 1 to 2% of the total aluminum melted ends up in the dross fraction.

Because the dross contains a high percentage of aluminum metal and because the dross fraction represents a substantial processing loss, efforts are ordinarily made to reprocess the dross to recover as much of its aluminum content as possible. Typical processing approaches used commercially today involve the collection, crushing and sizing of dross followed by smelting using a salt flux. Fluxes used typically comprise a mixture of sodium chloride and potassium chloride with small amounts, ordinarily 1% to 5%, of cryolite. Flux is mixed with the dross and charged into a rotating furnace which is heated to a temperature above the melting point of aluminum and of the flux. The salt flux selectively wets the non-metallic components of the dross and promotes the separation of metallic aluminum from the non-metallic fraction. Molten metal is thereafter tapped from the furnace and the residue is then dumped from the furnace. It has been the practice to dispose of the residue in a landfill.

It has been estimated that primary and secondary aluminum plants in the United States generate over 200,000 tons of highsalt residue annually from the processing of aluminum dross. Disposal of these residues by landfill techniques is coming under sharp criticism because ground water leaches the salts from the residue. Furthermore, use of salt fluxes creates corrosive fumes which must be recovered from the smelting operation.

SUMMARY OF THE INVENTION

I have found that aluminum may be recovered from dross without the use of a flux to achieve aluminum recoveries which equal or exceed those of conventional processing practices. Dross is heated in a closed furnace to a temperature above the melting point of aluminum under an inert gaseous atmosphere. Thereafter, the dross is gently agitated as by stirring to agglomerate the metallic aluminum contained in the dross and to physically separate metallic aluminum from aluminum oxide and other non-metallic constituents of the dross. Thereafter, aluminum is tapped from the furnace leaving a solid residue which may be further processed. Argon is preferred as the inert gas atmosphere. Use of a nitrogen atmosphere results in lower recoveries of metallic aluminum presumably because of its reaction with molten aluminum to form nitrides. Carbon dioxide is less satisfactory than is nitrogen but use of carbon dioxide does result in substantially higher recoveries of metallic aluminum than is possible to obtain in an air atmosphere. The technique is also applicable to the recovery of aluminum from scrap packaging materials such as beverage cans and to the processing of an aluminum-rich fraction separated from solid, urban wastes.

Hence, it is an object of my invention to recover metallic aluminum from scrap and processing wastes.

It is a specific object of my invention to recover aluminum from dross without the use of salt fluxes.

Another object of my invention is to recover aluminum in ingot form from scrap cans and urban waste.

DETAILED DESCRIPTION OF THE INVENTION

My invention will be described with reference to the accompanying drawings in which.

I have found that aluminum can be reclaimed from dross, waste beverage cans and the aluminum-rich fraction obtained from solid urban wastes with recoveries equal to or exceeding those of present processing practices. Conventional processes for reclaiming aluminum from these waste products utilize a sodium chloride-potassium chloride-cryolite salt flux added in an amount approximately equal to the non-metallic portion. The flux and dross mixture is heated to a temperature above the fusion point of aluminum and of the flux and thereafter metallic aluminum is separated from residue which comprises the salt flux and non-metallic constituents of the dross. This residue, which is very high in soluble salt content, must then either be reclaimed or disposed of in some fashion.

In my process, I dispense with the use of flux entirely but maintain an inert gas atmosphere, preferably of argon, during those stages of the process at which the dross is at a temperature greater than about 600° to 650° C. Heating is continued to a temperature above the melting point of aluminum, preferably in the range of about 700° to 800° C, for a time sufficient to melt all metallic aluminum contained in the dross. Thereafter, the dross is gently agitated as by slow stirring to agglomerate the molten aluminum gloubles and cause the agglomerated aluminum to settle to the bottom of the heated vessel or furnace. Agitation of the dross after its aluminum content has been melted is absolutely essential to obtain a high recovery of metallic aluminum. Residue produced by my process consists essentially of a metal-depleted dross containing mostly aluminum oxide with some residual metallic aluminum. This residue is substantially free of leachable salts and may be disposed of in a landfill without environmental harm. The residue also finds use as a "hot-topping" compound in the pouring of steel ingots.

Figure 1:
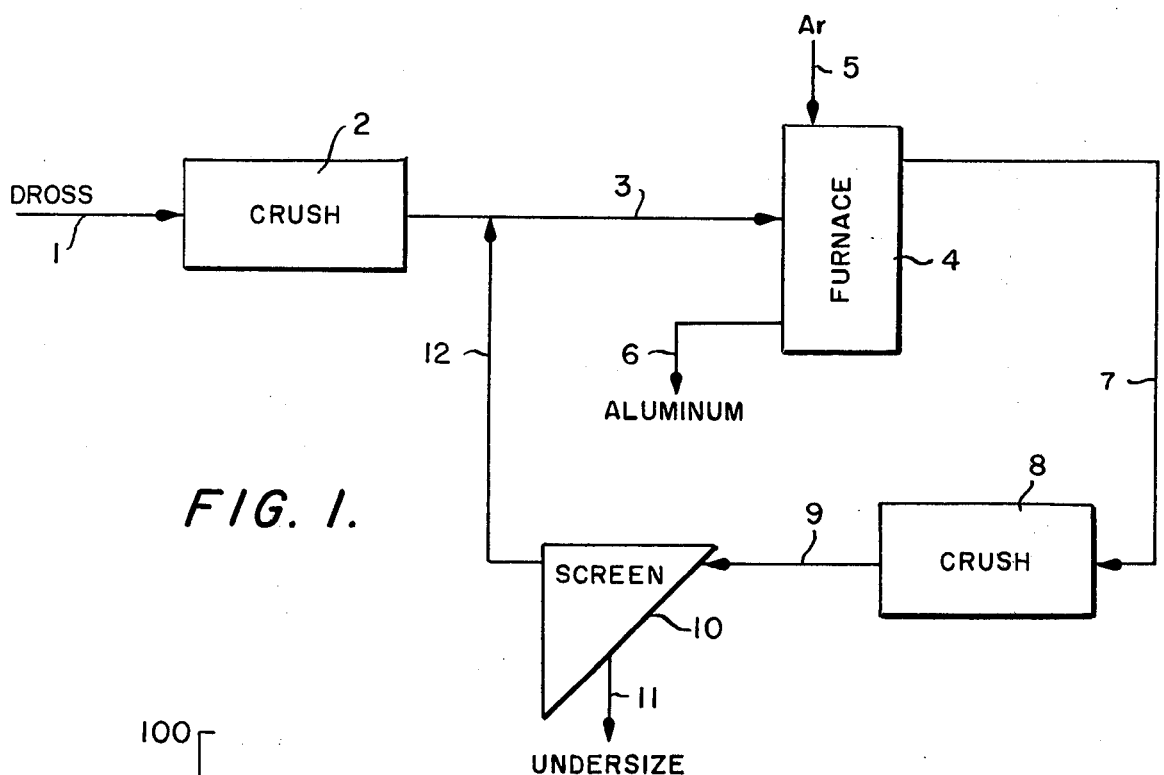
FIG. 1 is a schematic flowsheet of a semi-continuous process for the recovery of aluminum metal from dross.

Referring now to FIG. 1, there is shown a schematic flow diagram of a preferred embodiment of my invention as applied to the reclamation of aluminum dross. Dross fraction 1, produced by the working of molten aluminum, is subjected to a crushing step in means 2 which may be a roll crusher or like device. This step may be omitted if the dross is in a granulated form free of large chunks which would interfere with its convenient handling in subsequent processing steps. Crushed dross, conveniently having a maximum granule size of about 2 inches, is fed via means 3 to furnace 4. Furnace 4 may comprise any indirect-heated device capable of attaining temperatures of at least 750° C and having sealing or cover means sufficient to maintain a blanket of inert gas such as argon, introduced via means 5, within the furnace during the heating cycle. In addition, the furnace must have provisions for gently agitating the dross after the aluminum content contained in the dross has been melted. Agitation means associated with the furnace may comprise a simple propeller-type blade, constructed of materials such as silicon carbide-coated steel, which is arranged to travel from the top to the bottom of a pot-type furnace. When this mode of agitation is used, rotational speed of the blade appropriately may be in the range of about 5 to 20 rpm. Alternatively, the furnace may be of the rotary type in which agitation is accomplished by rotating the furnace. Agitation must be continued for a time sufficient to cause agglomeration of the melted aluminum globules and their accumulation into a molten pool at the bottom of the furnace. Generally, agitation times of 2 to 15 minutes are sufficient to accomplish that result.

After agitation has ceased, molten aluminum 6 is tapped or poured from the furnace into suitable molds. It is neither necessary nor advantageous to leave a quantity, or heel, of metallic aluminum within the furnace in preparation for the next dross charge as is conventional in the practice of the salt flux method. The solid residue remaining after tapping aluminum from the furnace may be characterized as a low-metal-content dross. It is dumped from the furnace and introduced, via means 7, into crushing means 8. It is desirable that means 8 impart an abrading action to the residue fraction in order to free metallic aluminum particles from entrapment in aluminum oxides. After being subjected to crushing and abrasion in means 8, the residue is passed via means 9 to screening means 10 where it is sized into a fine and a coarse fraction. The fine fraction 11, comprising mostly aluminum oxide, is removed from the process. This fine fraction may be discarded or may be used for other purposes such as for "hot-topping" steel ingots. Coarse fraction 12 comprises the metallic aluminum-rich portion of residue 7 and preferably is recycled back to the furnace for extraction of additional metallic aluminum. It is possible to operate my process on a strictly batch basis dispensing with the crushing, sizing and recycling steps but this decreases the ultimate aluminum recovery from the dross.

My process is also applicable to the reclamation of the aluminum rich fraction obtained from processing of solid urban wastes by techniques such as those developed by the U.S. Bureau of Mines and disclosed in U.S. Pat. No. 3,848,813. When processing such scrap fractions, the crushing step 2 of my process is seldom if ever necessary.

I have also found that scrap aluminum beverage cans and the like may be reclaimed in the same manner but some additional precautions are necessary. Beverage cans ordinarily contain several percent, usually about 2 to 4%, by weight of organic materials as linings, inks, labels and the like. When heated, these organic materials pyrolize and decompose to form flammable and explosive gases. Provision must be made to properly dispose of these gases, as by controlled burning, while the scrap charge within the furnace is heated. Pyrolysis of the organic material and evolution of flammable gases is essentially complete when the scrap charge reaches a temperature of about 600° C. Thereafter, the scrap charge within the furnace is maintained under an argon atmosphere during the melting and agglomeration steps of the process. Metal recoveries as high as 85 to 87%, based on the original scrap weight have been achieved using can stock. Since several percent of the scrap weight is pyrolized during the initial heating of the scrap, residue resulting from the reclamation process ordinarily amounts to some 10% of the original charge. In these cases, it may not be economic to crush and screen the residue and recycle the over-size portion. It has also been found that shredding can scrap and pressing the shredded scrap into briquettes prior to processing not only increases the furnace capacity but results in a significantly higher metal recovery. Maximum recovery of metallic aluminum requires a somewhat higher temperature than is optimum for the reclamation of aluminum dross. Reclamation of can scrap preferably is accomplished by heating in the temperature range of about 750° to 800° C although higher or lower temperatures may be used at the expense of somewhat decreased yields of metallic aluminum.

The following examples will more explicitly point out techniques appropriate for carrying out my invention and will illustrate preferred embodiments and results and benefits obtained from its practice.

EXAMPLE 1

Dross samples were obtained from a number of different industrial sources. The samples ranged widely in metallic aluminum content but in all cases were being reclaimed by conventional salt flux methods. These samples were processed in accordance with the techniques described previously.

Experimental procedure was as follows: A sample of aluminum dross was charged into a silicon carbide crucible heated by a resistance-wound pot furnace. The crucible was fitted with a removable lid adapted to accommodate a blade-type stirrer and a gas inlet. Temperature within the crucible was monitored by use of a Chromel-alumel thermocouple and was automatically controlled. The dross charge was heated to a temperature of 740° C and was maintained at that temperature for 60 minutes to insure that all metallic aluminum contained in the dross had melted. Thereafter, the dross charge was stirred for 2 to 10 minutes using a blade-type agitator rotating at about 12 rpm while causing the agitator to vertically traverse the crucible from the top to the bottom of the dross charge. Molten aluminum, which had collected as a pool in the bottom of the crucible, was then poured into a preheated steel mold. Residue remaining in the crucible, comprising mostly aluminum oxide and some oxide-coated, physically trapped metallic aluminum, was removed, cooled, crushed and sized by screening using a 20-mesh screen. The undersize fraction was set aside and the +20 mesh fraction was returned to the crucible with additional aluminum dross. This combined charge was processed as before to yield additional metal and residue. The total metal recovery was determined by weighing the ingots obtained.

Figure 2:
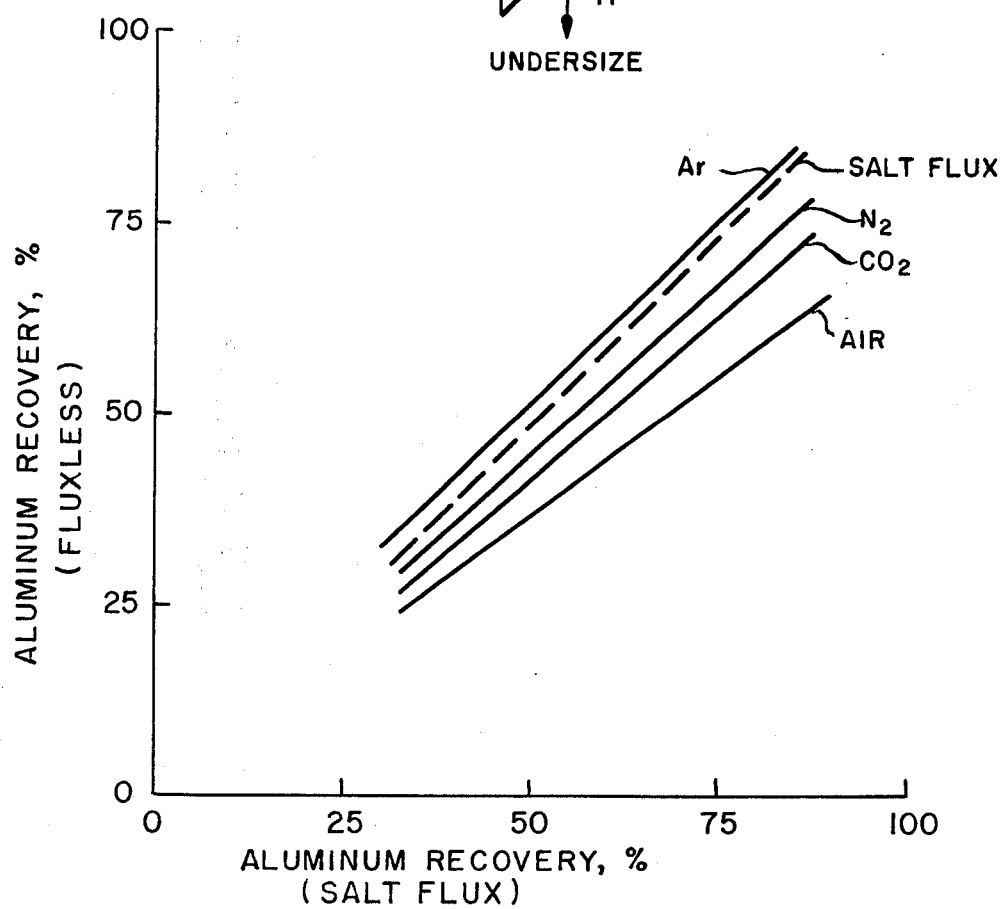
FIG. 2 illustrates the results obtained by use of my process relative to prior art techniques.

Tests were carried out using atmospheres of argon, nitrogen, carbon dioxide and air on a series of dross samples having varying metal concentrations. Results of these tests are shown graphically as FIG. 2. Aluminum recovery by use of the salt flux method, shown in the FIGURE, represents the actual recovery obtained in the commercial reclamation of the dross samples tested and these data have been plotted on the graph at a slope of 1. As may be seen from the plotted data, use of an argon atmosphere in my reclamation process provides aluminum recoveries equivalent to or better than that obtained in the commercial salt flux method.

Nitrogen, carbon dioxide and air gave progressively poorer results. Chemical analysis of the ingots obtained by use of my fluxless reclamation technique indicated that there was essentially no difference in purity, as compared to aluminum recovered by the conventional salt flux method.

Example 2

Four different samples of dross were obtained and were analyzed to determine total metallic aluminum by a deep-salt assay technique. This assay method is commonly used in the industry to give a value representing the maximum practical recovery of metallic aluminum from dross and differs from salt flux reclamation techniques primarily in the flux composition used. The assay technique utilized a flux consisting of potassium chloride and cryolite in about a 60:40 ratio.

Each of the dross samples was processed in a batch fashion as well as in a semi-continuous manner as described in relation to FIG. 1. Amount of residue produced by each of the three methods; salt flux, fluxless batch and fluxless semi-continuous, was determined. Argon was used as a protective atmosphere in those tests run without a salt flux. Results obtained are presented in the following table:

| | DROSS | RESIDUE, % OF DROSS WEIGHT | | |
|---|---|---|---|---|
| Sample | Available Aluminum, % (Deep-Salt Assay) | Smelter (Salt Flux) | Fluxless Batch | Semi-Continuous |
| A | 75.5 | 62 | 36 | 22 |
| B | 72.3 | 63 | 42 | 29 |
| C | 51.7 | 106 | 64 | 51 |
| D | 42.4 | 130 | 67 | 55 |

As may be readily appreciated from these data, my process substantially reduces the amount of residues produced in the reclamation of dross. Additionally, residues resulting from my process are free of leachable salts, are substantially chemically inert and may be disposed of in a landfill without environmental harm.

EXAMPLE 3

A sample of relatively low metal content aluminum dross was heated to a temperature of 740° C and held at that temperature for 60 minutes. An argon gas atmosphere was maintained after the dross temperature reached about 625° C and during the heating period. At the end of the heating period, molten aluminum was drained from the crucible into a preheated steel mold and the residue was removed from the crucible, cooled and weighed.

Aluminum metal recovery was 5.2% while the same dross, processed by the salt flux method, yielded an aluminum recovery of 46.7%. This example illustrates the importance of the agitation or stirring step of my process to obtain high recoveries of metallic aluminum.

EXAMPLE 4

An aluminum-rich fraction recovered from the processing of incinerated urban refuse was processed in a batch fashion under an argon gas atmosphere. Processing steps were similar to those described in the preceding examples. A metal recovery of 68% was obtained. Chemical analysis of the recovered ingot yielded the following results (%): Al, 96.5; Cu, 0.6; Zn, 0.3; Fe, 0.8; Mn, 0.6; Mg, 0.4; Si, 0.7 and Pb, 0.1.

EXAMPLE 5

An aluminum-rich fraction recovered from the processing of raw urban refuse was reclaimed in a batch fashion under an argon gas atmosphere. Processing steps were similar to those described in the preceding examples. Weight of the ingot obtained was 75.3% of the charge weight while some 5.7% of the charge constituted volatile matter representing organic contamination of the original aluminum-rich fraction. Chemical analysis of the recovered ingot was as follows (%): Al, 96.1; Cu, 1.0; Zn, 0.9; Fe, 0.6; Mn, 0.6; Mg, 0.6 and Si, 0.2.

EXAMPLE 6

Aluminum can scrap was shredded and was reclaimed in a batch fashion under an argon gas atmosphere. Because of the characteristics of this scrap, procedures necessarily must be modified somewhat in comparison to those employed in the reclamation of aluminum dross. Scrap was charged to a closed crucible having provisions for venting and disposing of volatiles produced by the pyrolysis of organic coatings, labels and inks on the can scrap. Heating to a temperature of approximately 600° C completely pyrolyzed the organic constituents with the production of flammable and explosive gases.

After pyrolysis of the organic matter was complete, the can scrap was then maintained under an argon atmosphere while the temperature was raised to about 740° C and maintained at that level for about 1 hour. The melted scrap was then stirred for 2 minutes and the molten aluminum was tapped from the crucible into a preheated steel mold. It was found that aluminum recoveries of 80 to 87%, based upon original charge weight, could routinely be obtained provided the shredded scrap was briquetted prior to treatment. When loose, shredded scrap was similarly processed, aluminum recoveries were typically some 10 to 15% less. It was also found that maximum metal recovery was obtained at a temperature within the general range of about 750° to 800° C. Residue remaining after recovery of metallic aluminum comprised a soft, black, non-adhering powder, apparently consisting mostly of carbon, with fine, flakelike particles of metallic aluminum.

Hence, it can be readily appreicated that my invention provides a technique for reclaiming aluminum from various scrap materials which avoids many of the problems of the prior art methods. By use of my process, corrosive salt fumes are eliminated, volume of process residues is substantially decreased, the residues produced are inert thus presenting less of a disposal problem and furnace capacity is increased because a fluxing agent is not used.

I claim:

1. A method for reclaiming aluminum metal from aluminum dross contaminated with non-metallic impurities which comprises:
   heating said aluminum dross under an inert gaseous atmosphere in the absence of flux to a temperature above the melting point of aluminum but below 800° C for a time sufficient to melt all of the metal contained in the dross;
   subjecting the dross to gentle agitation for a time sufficient to agglomerate the molten aluminum and to cause separation of molten aluminum from other constituents of the dross, and
   recovering a metallic aluminum product having a composition substantially the same as the metallic portion of said dross.

2. The process of claim 1 wherein said inert gaseous atmosphere is argon.

3. The process of claim 1 wherein the dross is heated to a temperature above the melting point of aluminum but below about 750° C.

4. The process of claim 1 wherein said gentle agitation comprises stirring.

5. The process of claim 1 wherein said gentle agitation comprises rotation of a vessel containing said dross.

6. The process of claim 1 wherein a dross residue comprising aluminum oxides, remaining after recovery of the aluminum product, is cooled, crushed and subjected to a physical sizing step to recover a fine and a coarse fraction.

7. The process of claim 6 wherein said course fraction is recycled to said heating step and wherein said fine fraction is rejected from the process.

8. The process of claim 7 wherein said coarse fraction is larger than about 20 mesh.

* * * * *